United States Patent
Schafferhans et al.

(10) Patent No.: US 12,194,872 B2
(45) Date of Patent: Jan. 14, 2025

(54) LOCKING DEVICE FOR ILLUMINATING THE PLUG CONTOUR OF A CHARGING SOCKET OF AN ELECTRIC VEHICLE

(71) Applicant: Lisa Draexlmaier GmbH, Vilsbiburg (DE)

(72) Inventors: Stephan Schafferhans, Munich (DE); Benjamin Reil, Pfaffenhofen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 242 days.

(21) Appl. No.: 17/678,594

(22) Filed: Feb. 23, 2022

(65) Prior Publication Data

US 2022/0281331 A1 Sep. 8, 2022

(51) Int. Cl.
  *B60L 53/16* (2019.01)
  *B60Q 1/26* (2006.01)
  *H01R 13/639* (2006.01)

(52) U.S. Cl.
  CPC ............ *B60L 53/16* (2019.02); *B60Q 1/2661* (2013.01); *H01R 13/639* (2013.01); *H01R 2201/26* (2013.01)

(58) Field of Classification Search
  CPC ..... B60L 53/16; B60Q 1/2661; H01R 13/639; H01R 2201/26
  USPC ...................................................... 174/74 R
  See application file for complete search history.

(56) References Cited

U.S. PATENT DOCUMENTS

2010/0246198 A1  9/2010  Hook et al.

FOREIGN PATENT DOCUMENTS

| DE | 102011108817 | 8/2012 |
| DE | 102014100640 | 7/2015 |
| DE | 102020120886 | 2/2021 |
| EP | 1103794 | 10/2000 |
| EP | 3584105 | 12/2019 |

OTHER PUBLICATIONS

DE102020120886 English Language Equivelant.
EP1103794 English Language Equivalent.
EP3584105 English Language Equivalent.
DE102011108817 English Language Equivalent.
DE 10 2021 105 132.0 German Office Action.
DE102014100640 English Language Equivalent.

*Primary Examiner* — Tremesha W Burns
(74) *Attorney, Agent, or Firm* — BelayIP

(57) ABSTRACT

The present disclosure relates to a locking device for locking a charging plug in a charging socket of an electric vehicle for charging a battery of the electric vehicle, the charging socket having a plug contour which corresponds to a plug contour of the charging plug, the locking device including a locking member configured to move to a locking position upon insertion of the charging plug into the charging receptacle and further configured to move to an unlocking position upon release of the charging plug from the charging receptacle. The locking device also includes a light guide adapted to illuminate the plug contour of the charging receptacle when the locking member is in the unlock position so as to facilitate insertion of the charging plug into the charging receptacle.

16 Claims, 10 Drawing Sheets

LOCKING DEVICE FOR ILLUMINATING THE PLUG CONTOUR OF A CHARGING SOCKET OF AN ELECTRIC VEHICLE

CROSS REFERENCE TO RELATED APPLICATIONS

The present application claims priority to German patent application DE 10 2021 105 132.0, filed Mar. 3, 2021, the content of which is herein incorporated by reference.

BACKGROUND OF THE INVENTION

Field of the Invention

The present invention relates to a locking device or locking actuator for locking a charging plug in a charging socket of an electric vehicle. The locking device is further used for search lighting, i.e., illuminating the plug face or the plug contour of the charging socket, and for status indication by integrating the lighting functions into the locking device.

Description of Related Art

Charging sockets in battery-powered electric vehicles (BEV) or plug-in hybrid electric vehicles (PHEV) generally always feature search lighting, which is intended to make it easier to insert the charging plug even in poor lighting conditions. For this purpose, additional light modules are usually installed in the area of the charging cradle, or the plug geometry is illuminated by a combination of integrated light source and light guide. The first variant is usually associated with additional cabling and costs, while the second variant is critical in terms of the available installation space, because minimum bending radii for light guides must be maintained, as well as an additional sealing point of the outer area with respect to the interior of the charging socket and the electronics it contains.

Charging sockets usually also have a status light. To indicate the current charging status or signal faults, at least one light element is usually positioned in the area of the charging socket so that it is clearly visible to the user. Separate light modules are used for this purpose, which are connected to the vehicle's control electronics, or light from a lamp integrated in the charging socket electronics is emitted via a light guide. These variants also have the disadvantages described above with regard to installation space and/or sealing.

BRIEF SUMMARY OF THE INVENTION

It is an object of the invention to provide a concept for improved search lighting of the charging socket of an electric vehicle, in particular a concept which does not have the disadvantages described above.

Furthermore, it is a task of the invention to create a concept for improved status lighting of the charging socket of an electric vehicle. This is also intended to overcome the disadvantages described above.

The present invention is based on the idea of using the electrical connection of the actuator to control lighting elements, which are integrated in the actuator housing and emit light via light guides in the direction of the connector face for improved search lighting or the vehicle exterior or design surface for improved status lighting.

By integrating the lighting functions, direct connection of the actuator to the charging socket on the one hand eliminates the need for additional plug and cable connections for lighting modules, and on the other hand makes optimum use of the available installation space. An actuator is required on the charging socket side for Type1/Type2/CCS1/CCS2 and the new ChaoJi charging sockets, for example, and is usually located in the immediate vicinity of the plug face, thus fulfilling a core criterion for most lighting scenarios, and offering a technical advantage by combining actuator technology and lighting.

In the following description, a locking device for locking a charging plug in a charging socket is described, which serves to realize improved search lighting or improved status lighting. The term locking device is used herein synonymously with the term locking actuator, or "actuator" for short. This locking device includes a locking element, an actuator, and a light guide.

According to a first aspect of the present invention, a problem is solved by a locking device for locking a charging plug in a charging socket of an electric vehicle for charging a battery of the electric vehicle, wherein the charging socket has a plug contour which corresponds to a plug contour of the charging plug, the locking device having the following: a locking element that is configured to move, upon insertion of the charging plug into the charging socket, into a locking position in which the locking element engages the charging plug and fixes the charging plug inserted into the charging socket, and that is further configured to move, upon release of the charging plug from the charging socket, into an unlocking position in which the locking element releases the charging plug and the charging plug can be released from the charging socket; a drive adapted to move the locking member to the locking position upon insertion of the charging plug into the charging socket or receptacle and to move the locking member to the unlocking position upon release of the charging plug from the charging receptacle; and a light guide adapted to illuminate the plug contour of the charging receptacle when the locking member is in the unlocking position to facilitate insertion of the charging plug into the charging receptacle.

With such a locking device, the lighting functions of the light guide can be integrated in the locking device or locking actuator together with the movement functions of the locking element when the charging plug is inserted into the charging socket, or the charging plug is released from the charging socket. This eliminates the need for additional plug and cable connections for lighting modules, and also makes optimum use of the available installation space. The combination of actuator and lighting offers a technical advantage to both the user and the manufacturer of the electric vehicle.

According to an exemplary embodiment of the locking device, the light guide is configured to couple out light in an illumination direction that is parallel to a plane of the connector contour of the charging socket.

This has a technical advantage that the light is distributed over the entire plane of the connector contour, resulting in optimum illumination of the connector contour.

According to an exemplary embodiment of the locking device, the locking device comprises a light source coupled to the light guide in the unlocked position of the locking element and guiding light into the light guide to illuminate the plug contour of the charging socket.

This has a technical advantage that the light source does not have to move along with the light guide and can therefore have a longer service life.

According to an exemplary embodiment of the locking device, the light guide moves away from the light source when the locking element is moved from the unlocking position to the locking position.

This achieves the technical advantage that light is only generated when the locking element is in the unlocking position and is also required by the user. In this way, energy resources are used sparingly, which conserves the battery.

According to an exemplary embodiment of the locking device, the light guide is integrated into the locking element and moves with the locking element to the locking position or the unlocking position.

This achieves the technical advantage that the light guide is compactly installed in the locking element and is therefore not subject to wear effects when the locking element is moved.

According to an exemplary embodiment of the locking device, when the locking element is moved from the unlocking position to the locking position and vice versa, the light guide moves with the locking element along an illumination axis of the light guide.

This has the technical advantage that the axis of movement of the locking element is at the same time the axis of illumination of the light guide, so that there is optimal illumination that is not shadowed by the locking element.

According to an exemplary embodiment of the locking device, the locking element has a cylindrical cavity into which the light guide is inserted in a force-fit, form-fit or material-fit manner.

This provides a technical advantage that the light guide is compactly inserted into the locking element and cannot be dislodged by moving the locking element.

According to an exemplary embodiment of the locking device, the light guide is arranged separately from the locking member in the locking device, and an illumination axis of the light guide is arranged coaxially with a moving direction of the locking member.

This provides a technical advantage that the light guide is fixed in the locking device and cannot be affected by the movement of the locking element.

According to an exemplary embodiment of the locking device, the locking device comprises a housing, the housing having a first opening through which the locking member moves when moving from the unlocking position to the locking position and vice versa; and the housing having a second opening into which the light guide is inserted.

This provides the technical advantage that the locking element and the light guide are protected by the housing from external influences, such as dirt, corrosion, etc., and the two openings of the housing enable the movement and illumination functions of the locking device and the locking actuator, respectively.

According to an exemplary embodiment of the locking device, the first opening and the second opening are arranged on the same side of the housing.

This achieves a technical advantage that the illumination of the plug contour of the charging socket takes place on the same side of the charging socket as the movement of the locking element with respect to the plug contour of the charging socket. This results in efficient interaction between the lighting and movement functions.

According to an exemplary embodiment of the locking device, the housing has a chamber in the region of the second opening in which a light source is arranged which is designed to couple light into the light guide.

This provides the technical advantage that the light source is efficiently protected by the housing chamber from external interference, e.g., contamination, corrosion, etc.

According to an exemplary embodiment of the interlock device, the light guide exits the second opening of the housing and directs light to and couples light out to a location spaced from the housing.

This has a technical advantage that the light illuminating the connector contour is stronger or better concentrated or focused.

According to an exemplary embodiment of the locking device, the locking device includes a transparent seal that seals the second opening of the housing and forms the light guide.

This provides the technical advantage that the locking device has a sealing function in addition to a movement and illumination function to protect the sensitive electrical and electronic components from environmental influences.

According to an exemplary embodiment of the locking device, the transparent seal is configured to couple light out of the second opening of the housing in a plurality of illumination directions.

This achieves a technical advantage that the connector contour can be optimally illuminated.

According to an exemplary embodiment of the locking device, the electric vehicle includes a design bezel having an illuminatable status indicator configured to visualize a status of the charging receptacle when illuminated; and the locking device includes a second light guide configured to direct light to the design bezel and illuminate the status indicator.

This achieves the technical advantage that, in addition to search lighting, status lighting can also be implemented by the locking device. The integration of the search and status lighting functions eliminates the need for additional plug and cable connections for lighting modules when the actuator is connected directly to the charging socket, and also makes optimum use of the available installation space.

According to an exemplary embodiment of the locking device, the second light guide is configured to couple out light in an illumination direction that is perpendicular to an illumination direction in which the light guide couples out light.

This achieves a technical advantage that the design panel can be optimally illuminated from below.

According to a second aspect of the invention, a problem is solved by a method for locking a charging plug in a charging socket of an electric vehicle for charging a battery of the electric vehicle, the charging socket having a plug contour corresponding to a plug contour of the charging plug, the method comprising the steps of: moving a locking member, upon insertion of the charging plug into the charging socket, to a locking position in which the locking member engages the charging plug and fixes the charging plug inserted into the charging socket; moving the locking member, upon release of the charging plug from the charging socket, to an unlocking position in which the locking member releases the charging plug and the charging plug can be released from the charging socket; and illuminating the plug contour of the charging socket with a light guide when the locking element is in the unlocking position to facilitate insertion of the charging plug into the charging socket, wherein the light guide together with the locking element and a drive for moving the locking element are accommodated in a locking device.

With such a method, the lighting functions of the light guide can be integrated in the locking device or locking actuator together with the movement functions of the locking element when the charging plug is inserted into the charging socket or the charging plug is released from the charging socket. This method eliminates the need for additional plug and cable connections for lighting modules and makes optimum use of the available installation space.

According to a third aspect of the present invention, a problem is solved by a computer program comprising a program code for executing the method according to the second aspect on a controller for controlling the locking device according to the first aspect or a battery management system.

This provides the technical advantage that the computer program can be easily executed on a controller, e.g., a battery management system.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure. The present invention is described in more detail below with reference to embodiments and the figures, wherein:

FIG. 5B a schematic representation of the locking device according to the third embodiment wherein the search lighting is switched on;

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" could be understood as including only one of A, only one of B, only one of C, or any combination of A, B, and C.

In the following detailed description, reference is made to the accompanying drawings, which form a part hereof and in which are shown, by way of illustration, specific embodiments in which the invention may be carried out. It is understood that other embodiments may be used, and structural or logical changes may be made without departing from the concept of the present invention. Therefore, the following detailed description is not to be understood in a limiting sense. It is further understood that the features of the various embodiments described herein may be combined, unless otherwise specifically indicated.

The aspects and embodiments are described with reference to the drawings, where like reference signs generally refer to like elements. In the following description, for purposes of explanation, numerous specific details are set forth to provide a thorough understanding of one or more aspects of the invention. However, it may be apparent to one skilled in the art that one or more aspects or embodiments may be embodied with a lesser degree of specific detail. In other instances, known structures and elements are shown in schematic form to facilitate description of one or more aspects or embodiments. It will be understood that other embodiments may be used and structural or logical changes may be made without departing from the concept of the present invention.

Figure 1:
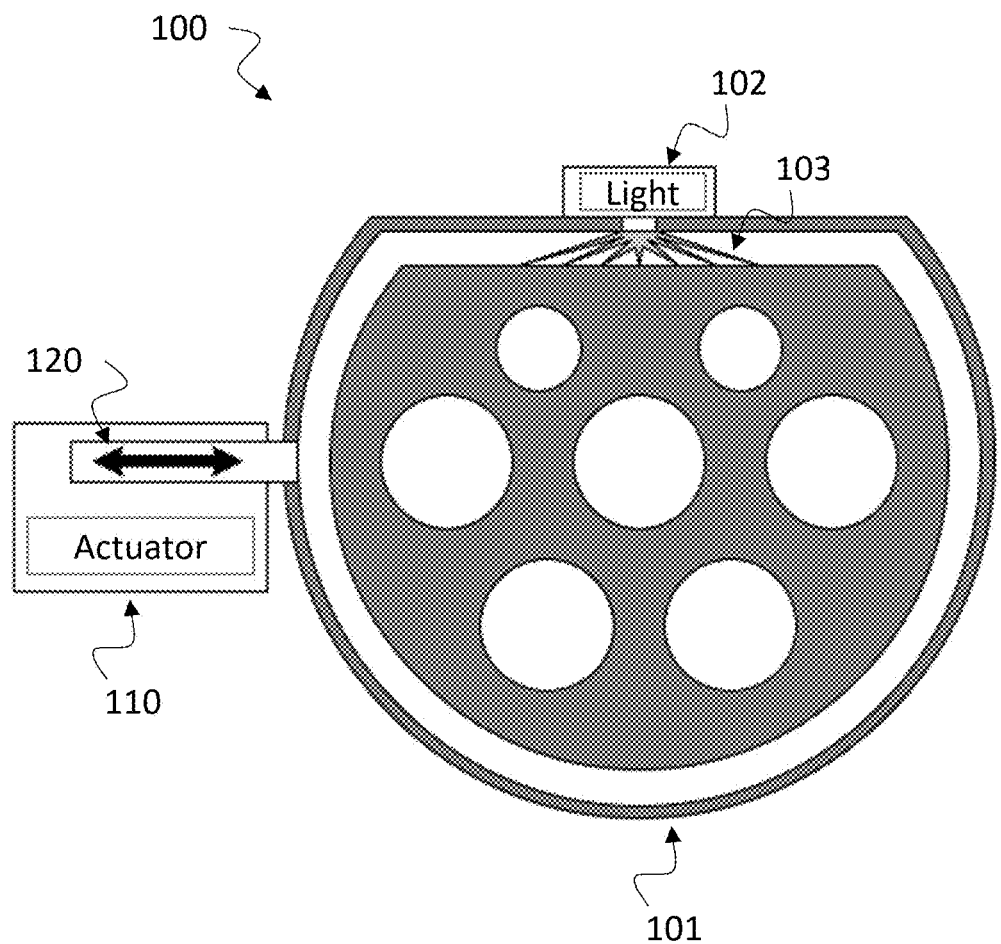
FIG. 1 depicts a schematic illustration of a conventional search light for illuminating the plug face of a charging receptacle.

FIG. 1 shows a schematic diagram of a conventional search light 100 for illuminating the plug face of a charging receptacle.

Here, a dedicated light module 102 is used to illuminate the plug face or the plug contour of the charging socket 101 from the side and makes its contour easily visible even in low light conditions. In addition, an actuator 110 is required to lock the charging plug during charging and to prevent it from being unplugged. The light module 102 illuminates the plug face from above and the actuator 110 is mounted on the left side of the charging socket 101.

Mounting the light module 102 usually involves additional wiring and costs. Furthermore, problems may arise with regard to the available installation space because minimum bending radii for light guides must be observed and an additional sealing point of the outer area with respect to the interior of the charging socket and the electronics contained therein must be implemented.

Figure 2:
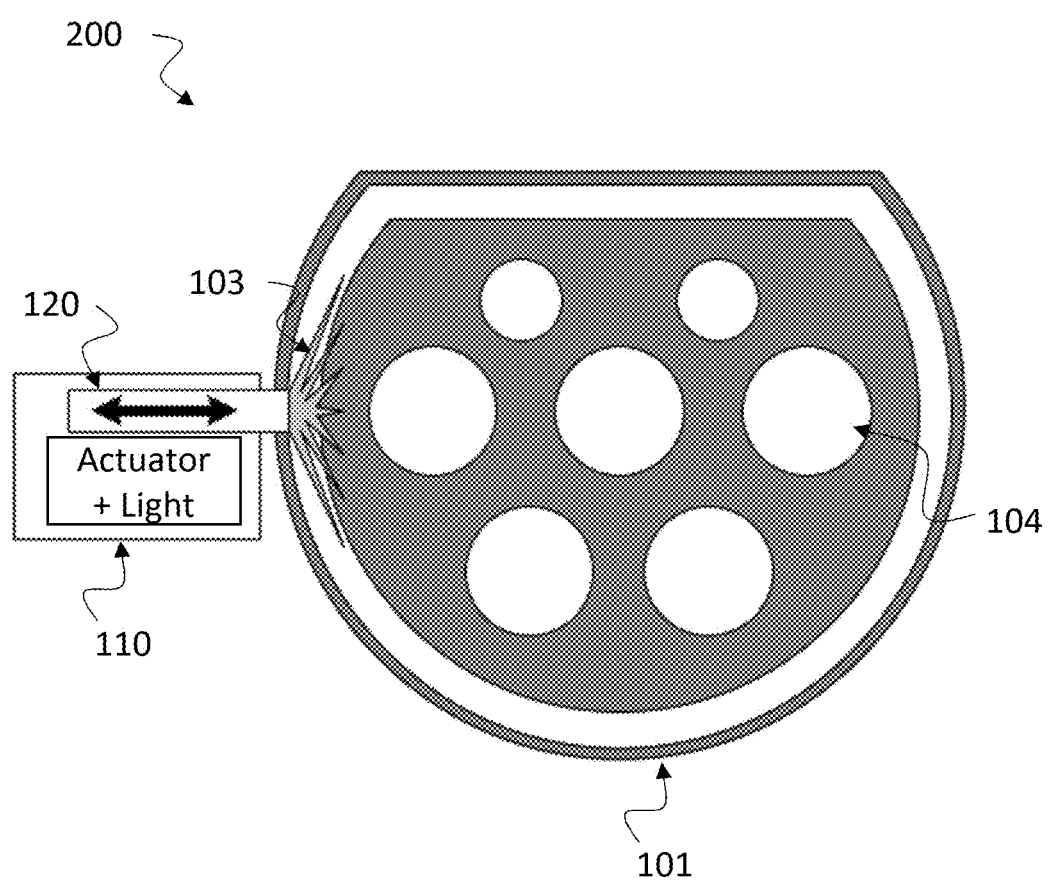
FIG. 2 depicts schematic representations of a search light for illuminating the plug profile of a charging socket.

FIG. 2 depicts a schematic representation of a search light 200 according to the present invention for illuminating the plug profile 104 of a charging socket 101. Due to the integration of the search light into the actuator, the light module 102 from FIG. 1 for illuminating the plug contour is omitted.

Such an actuator 110, also referred to in this disclosure as a locking actuator or generally as a locking device, is used to lock a charging plug in a charging socket 101 of an electric vehicle for charging a battery of the electric vehicle, the charging socket 101 having a plug contour 104 corresponding to a plug contour of the charging plug.

The locking device 110 comprises a locking member 120 configured to move to a locking position 300b, 400b, for example, when the charging plug is inserted into the charging socket 101. According to the illustration in FIGS. 3B and 4B, in which the locking element 120 engages the charging plug and fixes the charging plug inserted into the charging socket 101, and which is further configured to move, when the charging plug is released from the charging socket 101, into an unlocking position 300a, 400a, e.g. according to the illustration in FIGS. 3A and 4A, in which the locking element 120 releases the charging plug and the charging plug can be released from the charging socket 101.

Figure 3A:
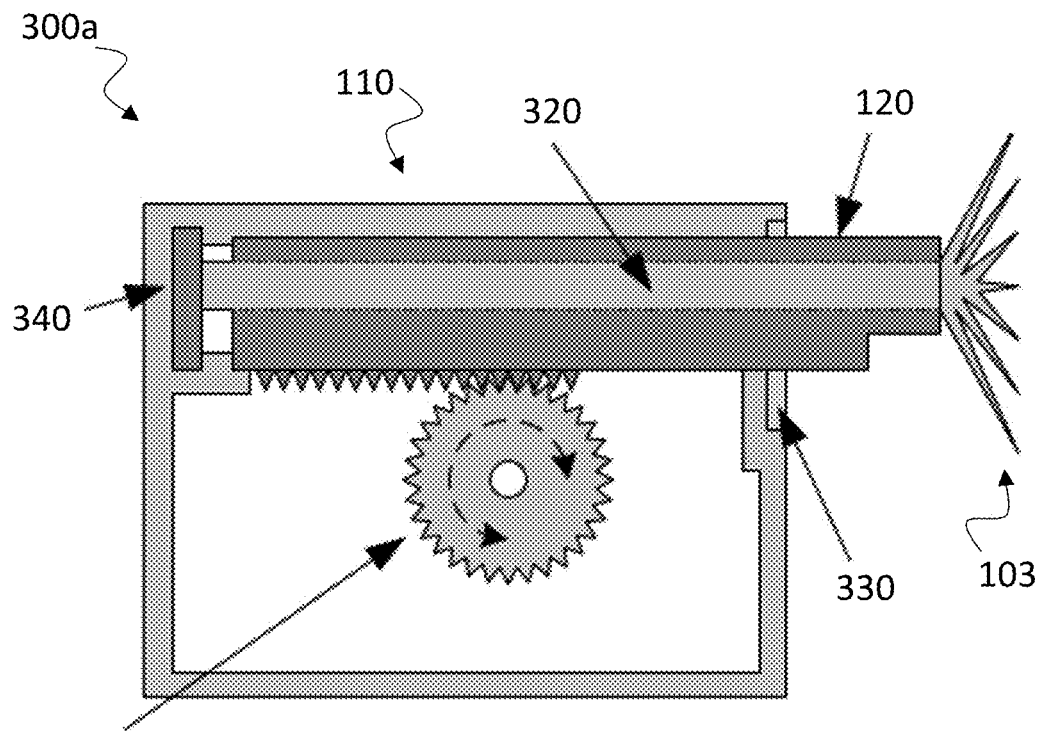
FIG. 3A depicts a schematic illustration of locking device according to a first embodiment, which is in an unlocked position.

The locking device 110 further comprises a drive 310, for example according to the illustration in FIGS. 3A/b and 4A/b, configured to move the locking element 120 to the locking position 300b, 400b when the charging plug is inserted into the charging socket 101 and to move the locking element 120 to the unlocking position 300a, 400a when the charging plug is released from the charging socket 101.

The locking device 110 further comprises a light guide 320, e.g., as shown in FIGS. 3A/b and 4A/b, configured to illuminate the plug contour 104 of the charging receptacle 101 when, the locking member 120 is in the unlocking position 300a, 400a to facilitate insertion of the charging plug into the charging receptacle.

The light guide 320 may be configured to couple out the light 103 in an illumination direction that is parallel to a plane of the connector contour 104 of the charging receptacle, as shown in FIG. 1 where the plane of the connector contour 104 is in the drawing plane.

Further embodiments of the locking device 110 are described in more detail in the following FIGS. 3 to 9.

Figure 3B:
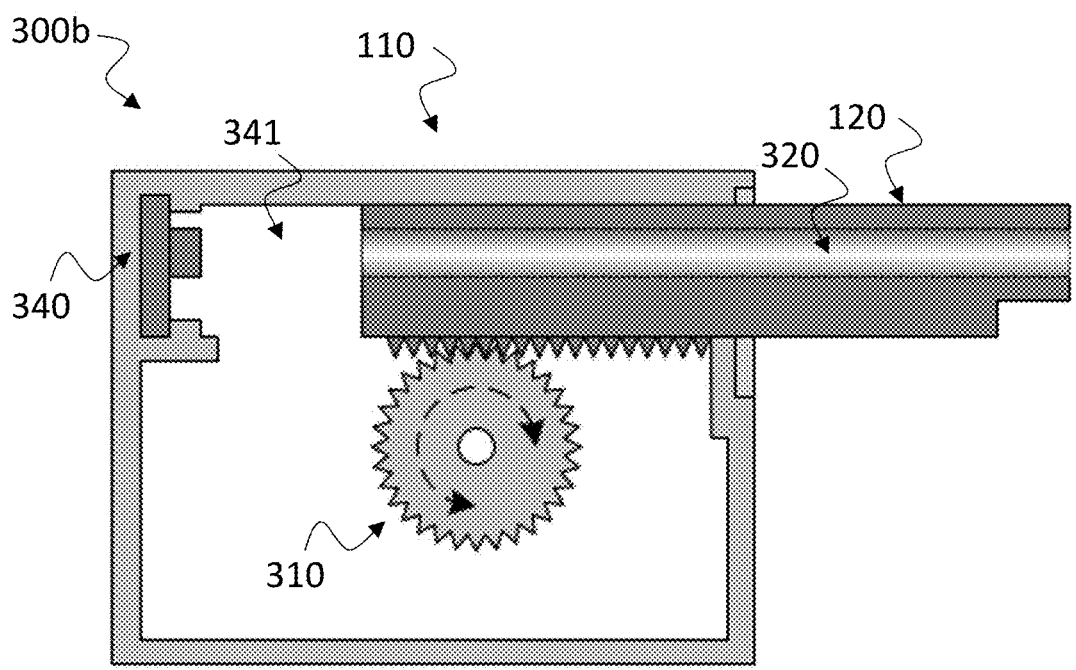
FIG. 3B depicts a schematic representation of the locking device according to a first embodiment in a locked position.

FIG. 3A depicts a schematic representation of a locking device 110 according to the invention in accordance with a first embodiment, which is located in a unlocking position. FIG. 3B shows a schematic representation of the locking device 110 according to the invention in accordance with the first embodiment, which is in a locking position.

The locking device 110 of FIGS. 3A and 3B is an embodiment of the locking device 100 described above with respect to FIG. 2.

In this embodiment, the locking device 110 may include a light source 340 coupled to the light guide 320 when the locking element 120 is in the unlocked position 300a (see FIG. 3A) and directing light 103 into the light guide 320 to illuminate the connector contour 104 of the charging receptacle or socket 101.

The light guide 320 may move away from the light source 340 as the locking member or element 120 moves from the unlock position 300a to the lock position 300b (see FIG. 3B).

In the embodiment of FIG. 3, the light guide 320 is integrated with the locking member 120 and moves with the locking member 120 to the locking position 300b or the unlocking position 300a.

In the embodiment of FIG. 3, when the locking element 120 is moved from the unlocking position 300a to the locking position 300b and vice versa, the light guide 320 may move with the locking element 120 along an illumination axis of the light guide 320. Here, the illumination axis extends from left to right through the drawing plane.

In the embodiment of the FIG. 3, the locking element 120 has a cylindrical cavity into which the light guide 320 can be inserted in a force-fit, form-fit or material-fit manner.

As shown in FIGS. 3A and 3B, one way to integrate the search illumination is to integrate the light guide 320 with the locking element 120. In the retracted (unlocked) state (see FIG. 3A), the locking element 120 with the light guide 320 assumes a position that allows optical coupling of the light guide 320 with the illuminant 340. The illuminant 340, for example in the form of an LED, may be mounted on a printed circuit board, for example. Thus, the (search) light 103 is guided through the locking element 120 to the connector face 104.

In the case of a locally fixed light source 340, decoupling is no longer possible in the locked state (see FIG. 3B), but it is also not necessary according to the operating strategy "charging plug is inserted and locked". The advantage of this variant is the simple adoption of this solution in existing products since no additional sealing surface is required and also no additional opening on the side wall of the connector geometry for an additional light guide is required. Depending on the design of the gear unit and the design of the electrical connection, however, this variant can lead to an increase in the actuator installation space.

Since the locking element 120 must meet high stability requirements, in particular withstand strong tensile forces on the charging plug, in addition to the use of a 2-component locking element 120 made of plastic, the use of a metallic pin with integrated light guide 320 is also feasible in one embodiment. Likewise, the design of the complete locking element made of a light-transmitting material can be realized in one embodiment.

Figure 4A:
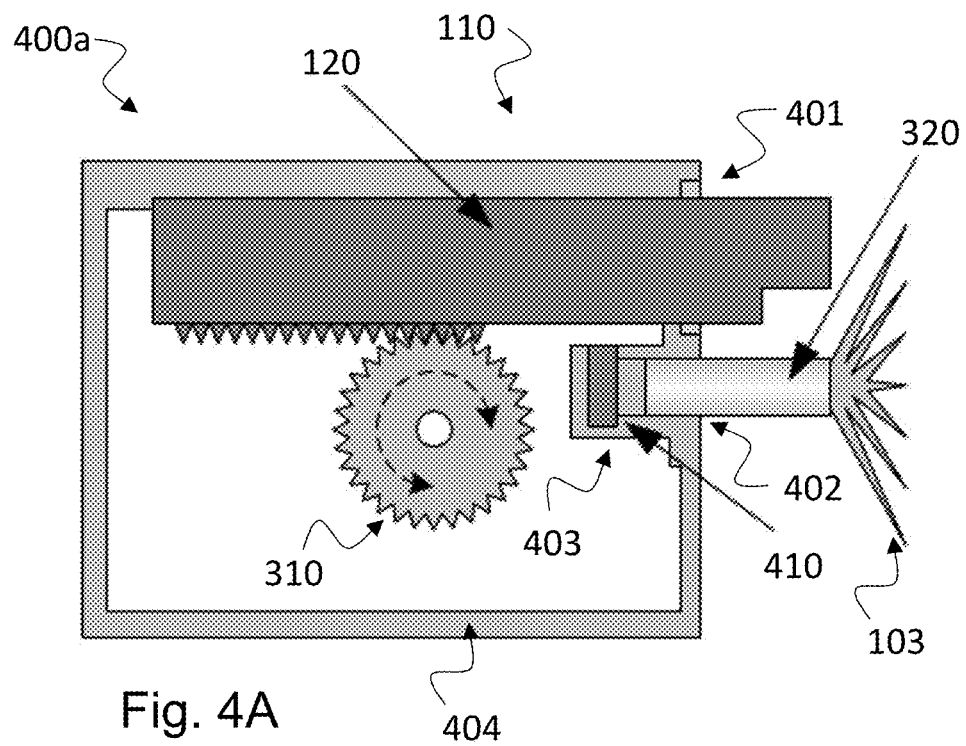
FIG. 4A depicts a schematic illustration of a locking device according to second embodiment in an unlocking position.
Figure 4B:
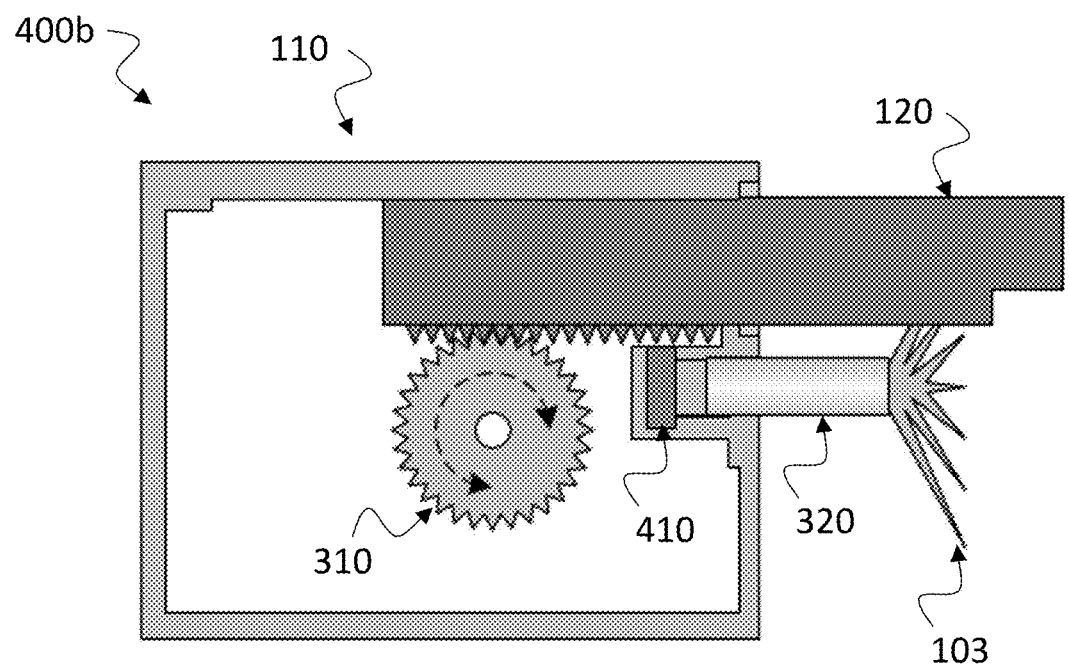
FIG. 4B depicts a schematic representation of the locking device according to the second embodiment in a locked position.

FIG. 4A depicts a schematic representation of a locking device 110 according to the invention, according to a second embodiment example, which is in an unlocking position. FIG. 4B depicts a schematic representation of a locking device 110 according to the invention in accordance with the second embodiment example, which is in a locking position.

The locking device 110 of FIGS. 4A and 4B is an embodiment of the locking device 100 described above with respect to FIG. 2.

In this embodiment, the locking device 110 may include a light source 410 coupled to the light guide 320 that directs light 103 into the light guide 320 to illuminate the connector contour 104 of the charging receptacle 101.

In this embodiment, the light guide 320 is arranged separately from the locking element 120 in the locking device 110. An illumination axis of the light guide 320 is arranged here coaxially with a direction of movement of the locking element 120, which here is from left to right through the drawing plane.

In this embodiment, the locking device 110 comprises a housing 404 having a first opening 401 through which the locking element 120 moves when moving from the unlocking position 400a (see FIG. 4A) to the locking position 400b (see FIG. 4B) and vice versa. The housing 404 includes a second opening 402 into which the light guide 320 is inserted.

In this embodiment, the first opening 401 and the second opening 402 are arranged on the same side of the housing.

The housing 404 may include a housing chamber 403 in the region of the second opening 402, in which a light source 410 is arranged that is configured to couple light 103 into the light guide 320. The light source 410 may, for example, be in the form of an LED mounted on a printed circuit board. Thus, the (search) light 103 is directed coaxially, e.g., below the locking element 120, as shown in FIGS. 4A and 4B, to the connector face 104. Of course, the second opening 402 may be on top of the first opening 401, so that the (search) light 103 is guided to the connector face 104 above the locking element 120.

In the embodiment of FIGS. 4A and 4B, the light guide 320 may extend from the second opening 402 of the housing 404 and guide light 103 to a location spaced from the housing 404 and couple the light 103 therefrom.

The two openings 401, 402 may be sealed from the exterior of the housing by appropriate gaskets or a single seal.

For example, the actuator 310 may be a gearwheel whose gears engage corresponding teeth of the locking element 120 to move the locking element 120 to the locking position or the unlocking position. The drive may also be electromagnetic, magnetic, or induction based.

FIGS. 4A and 4B thus illustrate an alternative solution, which consists of using an additional light guide 320 and leaving the locking element 120 untouched. An additional sealing surface can be avoided by integrating the light guide 320 into the housing 404 via a 2K injection molding process. In addition, the solution offers increased flexibility with respect to the precise light emission, since the light guide 320 can also be angled or bent. In addition, the illumination function is independent of the position of the locking element 120.

Figure 5A:
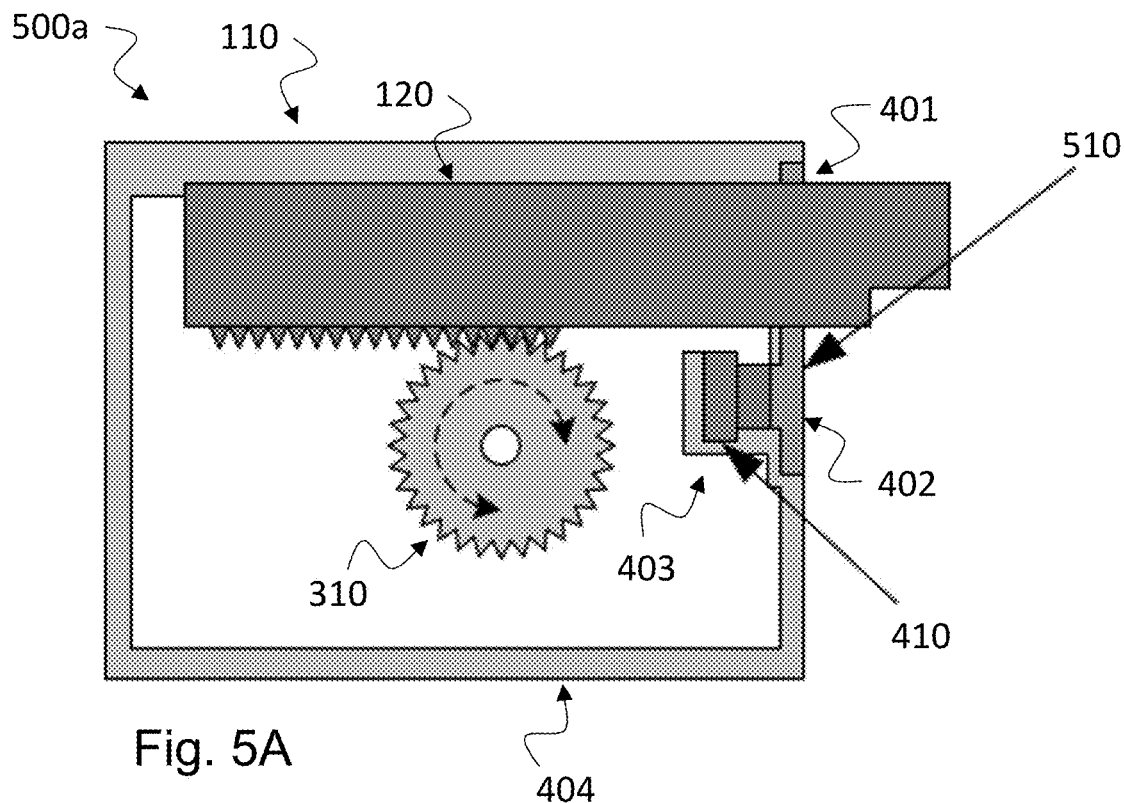
FIG. 5A depicts a schematic illustration of an interlocking device according to a third embodiment wherein the search lighting is turned off.
Figure 5B:
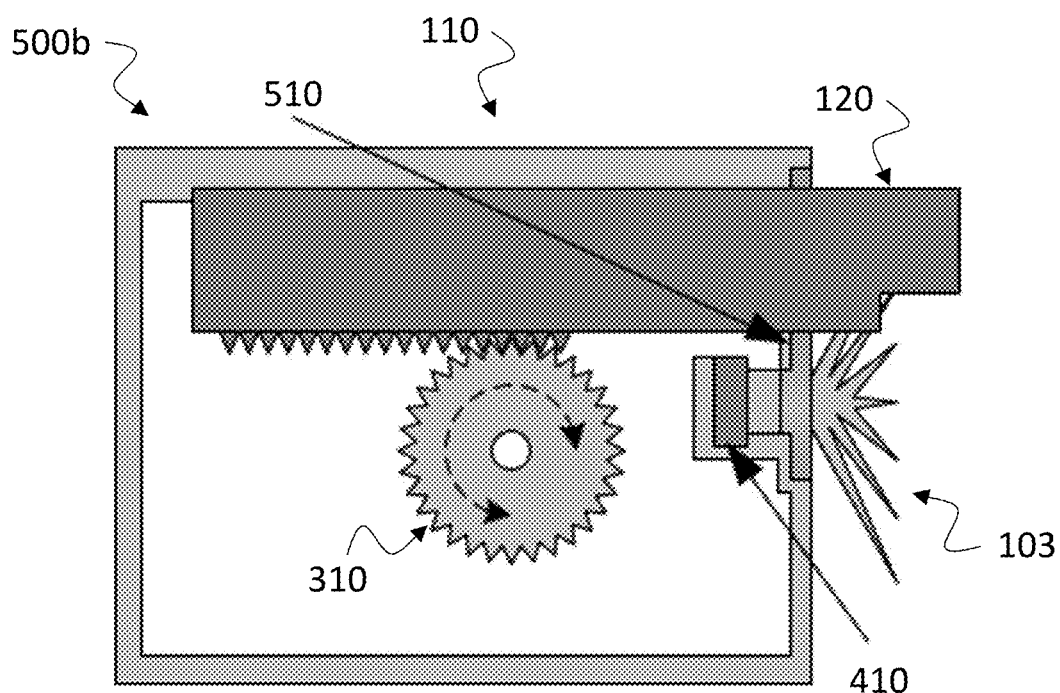

FIG. 5A depicts a schematic representation of a locking device 110 according to the invention according to a third example embodiment, in which the search lighting is switched off. FIG. 5B depicts a schematic representation of the locking device 110 according to the invention in accordance with the third embodiment, in which the search lighting is switched on.

The locking device 110 of FIGS. 5A and 5B is an embodiment of the locking device 100 described above with respect to FIG. 2.

In this embodiment, the locking device 110 may include a light source 410 coupled to the light guide 510 that directs light 103 into the light guide 510 to illuminate the connector contour 104 of the charging receptacle 101.

In this embodiment, the light guide 510 is arranged separately from the locking element 120 in the locking device 110.

As described above in FIGS. 4A and 4B, in this embodiment, the locking device 110 also includes a housing 404 having a first opening 401 through which the locking element 120 moves when moving from the unlocking position 400a (see FIGS. 5A and 5B) to the locking position (not shown) and vice versa. The housing 404 includes a second opening 402 into which the light guide 510 is inserted.

Also in this embodiment, the first opening 401 and the second opening 402 are arranged on the same side of the housing.

In accordance with the embodiment described above with respect to FIGS. 4A and 4B, the housing 404 may comprise, in the region of the second opening 402, a chamber 403 in which a light source 410 is arranged, which is configured to couple light 103 into the light guide 510. The light source 410 may, for example, be in the form of an LED mounted on a printed circuit board.

In contrast to the embodiment of FIGS. 4A and 4B, the light guide 510 may be formed by a transparent seal 510 of the housing that seals the second opening 402 of the housing 404.

The transparent seal 510 may be configured to couple light 103 out of the second opening 402 of the housing 404 in a plurality of illumination directions.

FIGS. 5A and 5B thus represent a third solution variant, which is realized by a (partially) transparent sealing mat 510. The lighting element 410 can be arranged directly behind it and shines through the sealing mat 510, so that the sealing mat 510 serves on the one hand as a light guide and on the other hand at the same time as a diffusing screen and thus enables more illumination over a wider area.

The use of a printed circuit board as a support for the lighting element is not absolutely necessary and should be seen here only as an example of an embodiment. Likewise, the shape of the locking element 120 can be selected independently of the innovation described herein, the only thing common to all embodiments described herein being the integration of the light guide (as a function, not necessarily as an additional component) into the locking device 110. In addition, embodiments are realizable in which the coupling out of the light occurs in a direction other than the direction of movement of the locking element, e.g., by reflective edges/surfaces of the light guide or special scattering properties at the end of the light exit.

Figure 6:
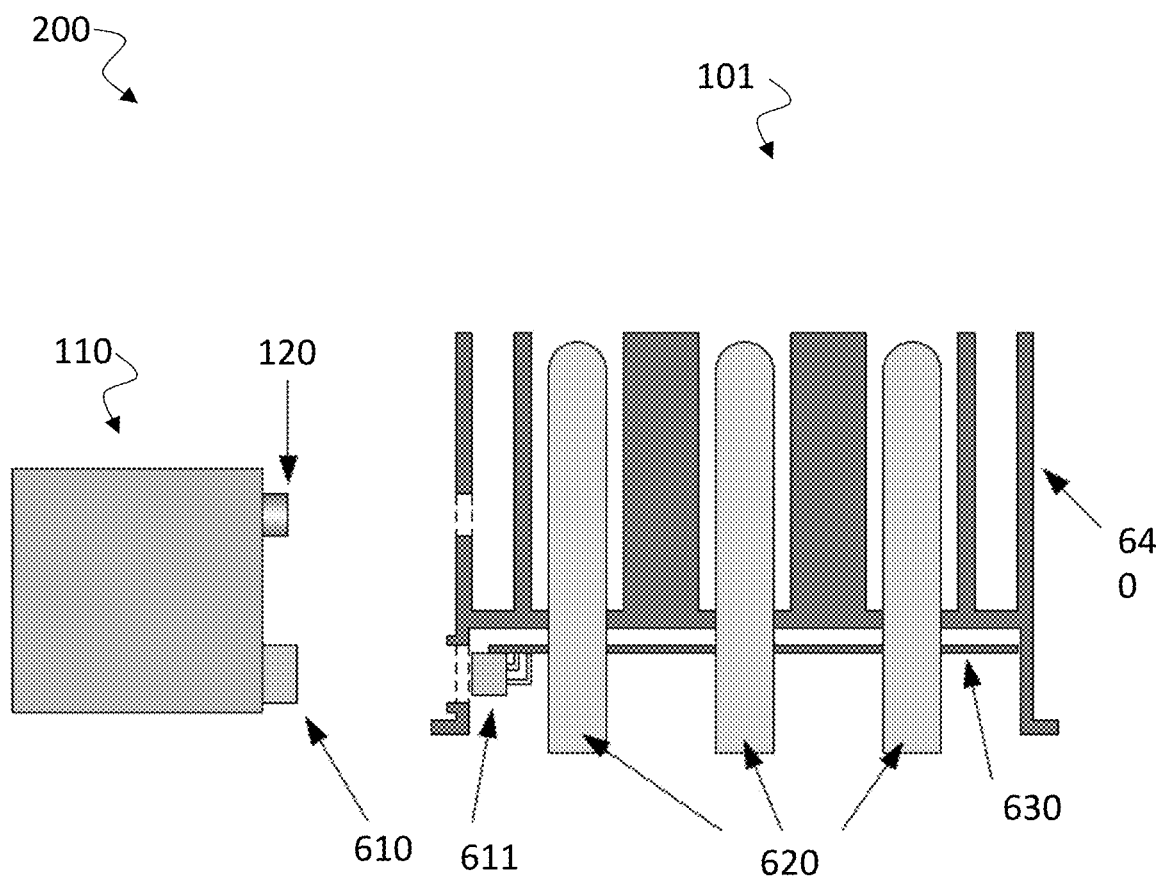
FIG. 6 is a schematic representation of a search light comprising a charging socket and a locking device not connected to the charging socket.

FIG. 6 depicts a schematic diagram of a search lighting system 200 according to the invention with a charging socket 101 and an interlocking device 110 not connected to the charging socket 101, according to one embodiment.

In order to make optimum use of the installation space, direct contacting of the locking actuator or the locking device 110 by the charging socket electronics 630 is advantageous. For this purpose, a connector 611 is provided on the side of the charging socket 101, which is automatically contacted when the locking actuator or the locking device 110 is screwed/clipped/plugged onto the charging socket 101.

The charging socket 101 has a housing 640 that accommodates the high-voltage pins 620, the charging socket electronics 630, which may be mounted on a printed circuit board, for example, and the connector 611 of the charging socket electronics 630. When the charging plug is plugged in, corresponding high-voltage pins of the charging plug engage in the high-voltage pins 620 of the charging socket to establish the electrical connection required for charging. Here, the charging plug is inserted into the charging receptacle 101 from above in the drawing plane, as shown in more detail with respect to FIG. 7A.

Figure 7A:
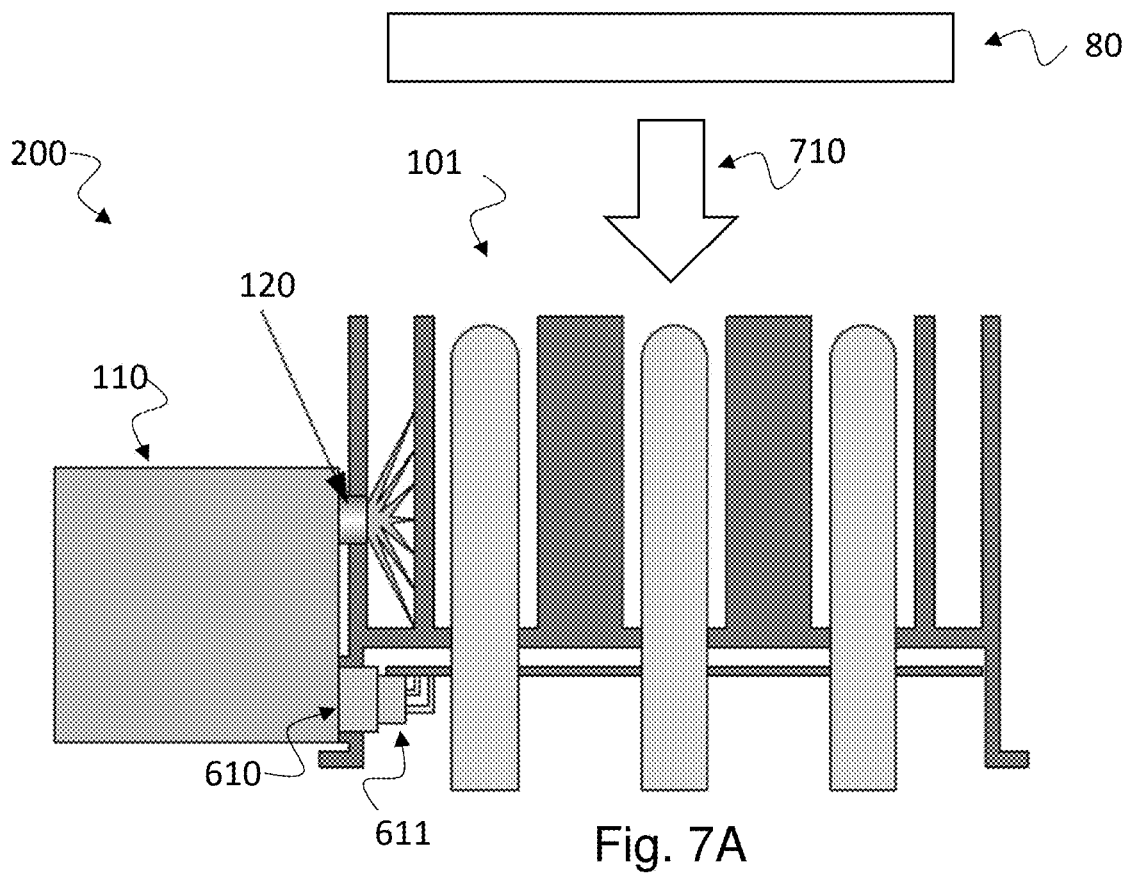
FIG. 7A depicts a schematic representation of the search lighting wherein the locking device is connected to the charging socket and the locking element is connected in an unlocking position.

FIG. 7A depicts a schematic representation of the search lighting 200 according to the present invention of FIG. 6, in which the locking device 110 is connected to the charging socket 101 and the locking element is in the unlocked position. Here, the search light is on and the locking element 120 retracted to allow the charging plug to be inserted into the charging socket 101 The direction of insertion 710 of the charging plug 80 into the charging socket 101 is shown.

Figure 7B:
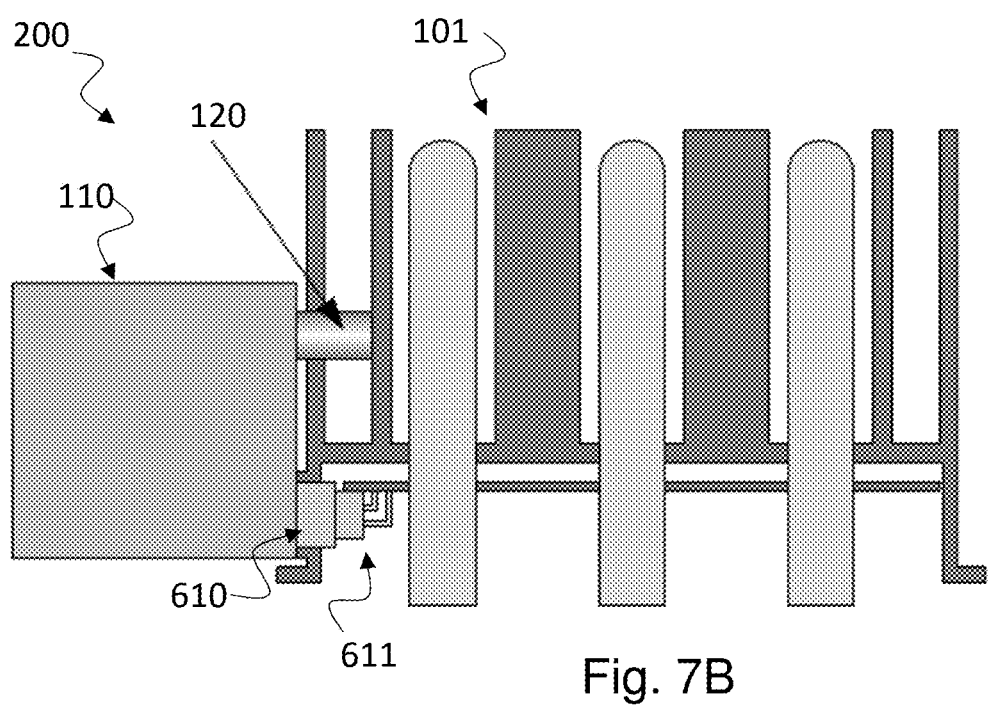
FIG. 7B depicts a schematic representation of the search lighting wherein the locking device is connected to the charging socket and the locking element is in the locking position.

FIG. 7B depicts a schematic representation of the search lighting 200 of FIG. 6 according to the present invention, in which the locking device 110 is connected to the charging socket 101 and the locking element is in the locking position. Here, the locking member 120 is extended to prevent removal of the locked charging plug. The search light is not needed in this state.

The locking actuator or locking device 110 may be contacted directly to the charging receptacle 101, as shown in FIGS. 7A and 7B. These FIGS. 7A and 7B show a possible advantageous embodiment. In an alternative embodiment, the contacting of the locking actuator or the locking device 110 can be made via a cable harness, in which case the cable harness can be plugged into the locking device 110 or can be directly integrated into the locking device 110.

Figure 8A:
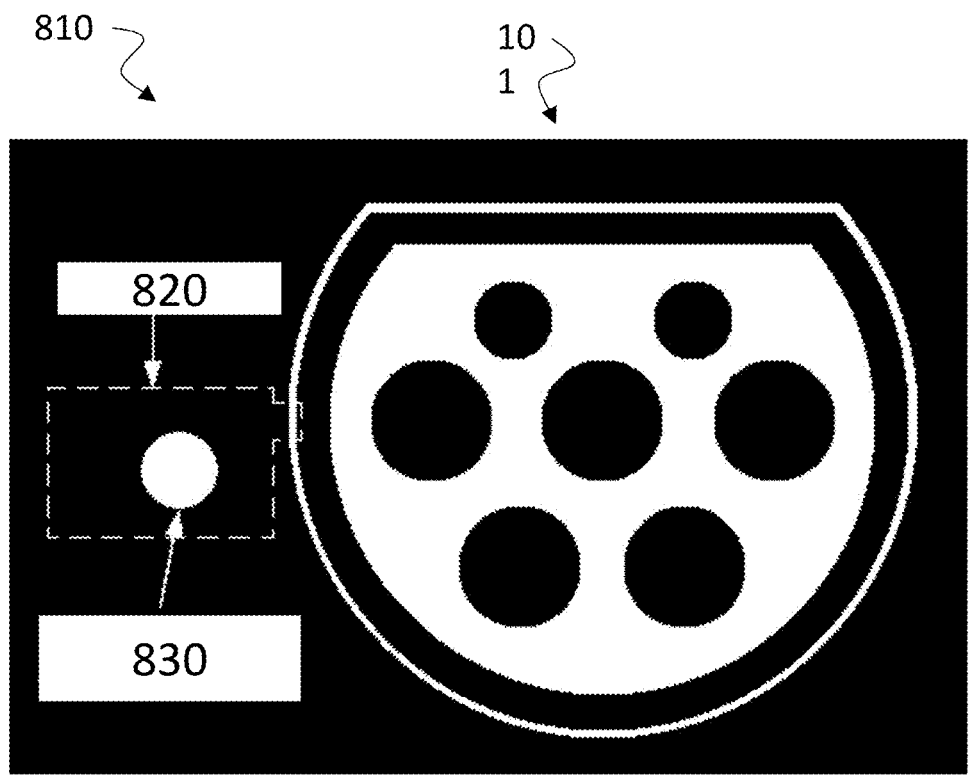
FIG. 8A depicts a schematic representation of a design panel in the switched-off state.
Figure 8B:
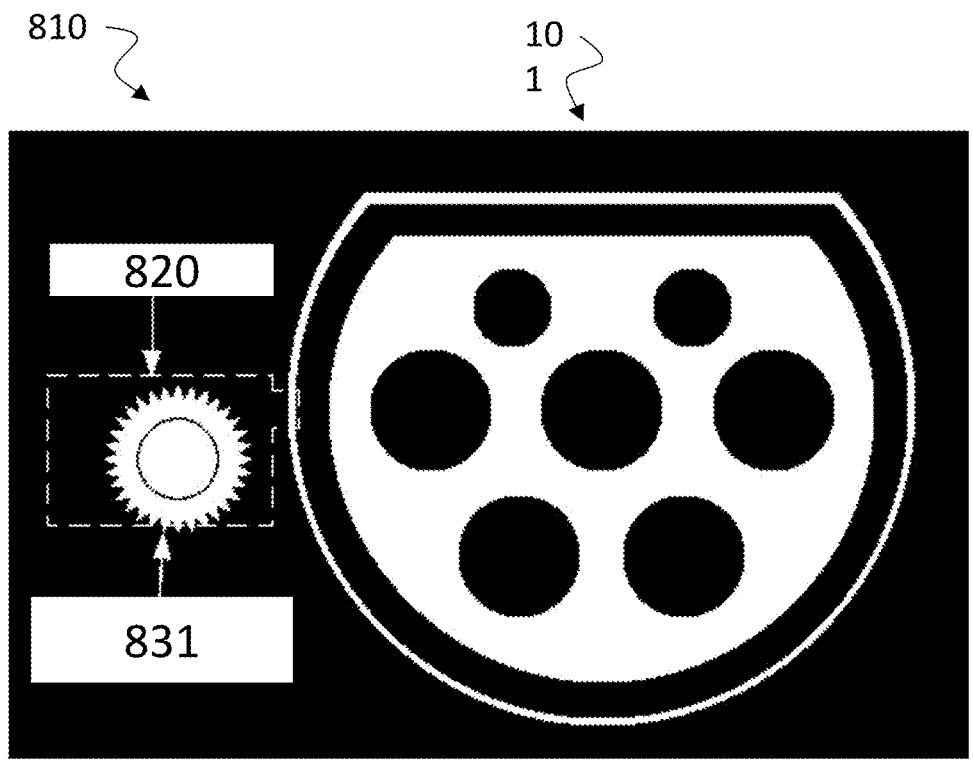
FIG. 8B depicts a schematic representation of a design panel in the switched-on state.

FIG. 8A depicts a schematic representation of a design panel 810 according to the invention in the switched-off state. FIG. 8B depicts a schematic representation of a design panel 810 according to the invention in the switched-on state.

The electric vehicle may have a design bezel 810 with an illuminable status indicator 830, 831 configured to make visible a status of the charging socket 101 when illuminated.

At least one light element 830, 831 is arranged in the area of the charging socket 101 so as to be clearly visible to the user for indicating the current charging status or signaling faults.

Figure 9:
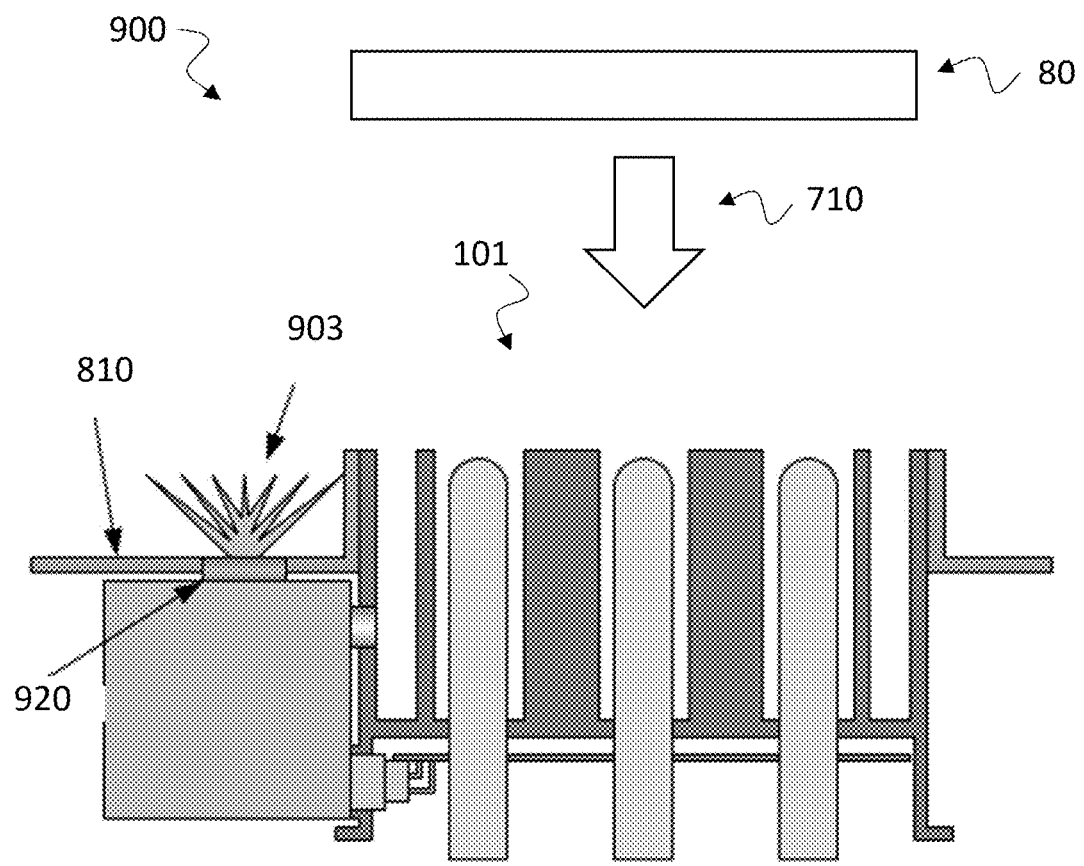
FIG. 9 depicts a schematic representation of a status light in the switched-on state.

The locking device 110 may include a second light guide 920, as shown in more detail in FIG. 9, configured to direct light 903 to the design bezel 810 and illuminate the status indicator 830, 831. The direction of insertion 710 of the charging plug 80 into the charging socket 101 is shown.

FIGS. 8A and 8B depict the contour 820 of the interlocking device 110, which is located below the design bezel 810 so that the second light guide 920 emerges upwardly from the interlocking device 110 to illuminate the lighting element 830, 831. The lighting element in the unilluminated state is represented by reference numeral 830, while in the illuminated state it is represented by reference numeral 831.

The second light guide 920 may be configured to couple out light 903 in an illumination direction that is perpendicular to an illumination direction in which the light guide 320 couples out light 103 (not shown here). Thus, the second light guide 920 can couple out light out of the drawing plane, while the (first) light guide 320 can couple out light below the drawing plane from left to right toward the connector contour 104 of the charging receptacle 101.

Since the locking actuator 110, at least in the case of Type2/CCS2 charging sockets, is generally placed next to the plug face 104, and thus directly behind the design bezel 810 visible from the outside, the integration of illuminants in the locking actuator 110 additionally opens up the possibility of implementing the status illumination without an additional light module.

For this purpose, the locking actuator 110 can have an opening with a light guide on the outside of the vehicle, which directs the light from a lamp located inside to the outside. This makes it easy to implement a simple geometry (e.g., a dot) as a status indicator, as shown in FIGS. 8A and 8b.

FIG. 9 depicts a schematic representation of a status illuminator 900 according to the invention in the switched-on state.

Here, too, the electrical interface is used to control the actuator motor in order to transmit the control signals for the illuminant (e.g., RGB LED). These can be discrete control signals, or they can be bus communication, for example a LIN (Local Interconnect Network) bus. In an advantageous technical solution, the housing of the locking actuator 110 may be designed as a 2-component injection molded part, where the light guide may be a part of the housing. This eliminates the need for another sealing surface. Furthermore, in another advantageous embodiment, the light spot on the design surface can be designed as an integrated diffusing disc, which can be in surface contact with the light guide of the locking actuator 110.

By a clever arrangement of the illuminant as well as the light guide, the implementation of both lighting scenarios, i.e., search and status lighting, is possible with only one illuminant, which limits the additional costs for the locking actuator 110.

Figure 10:
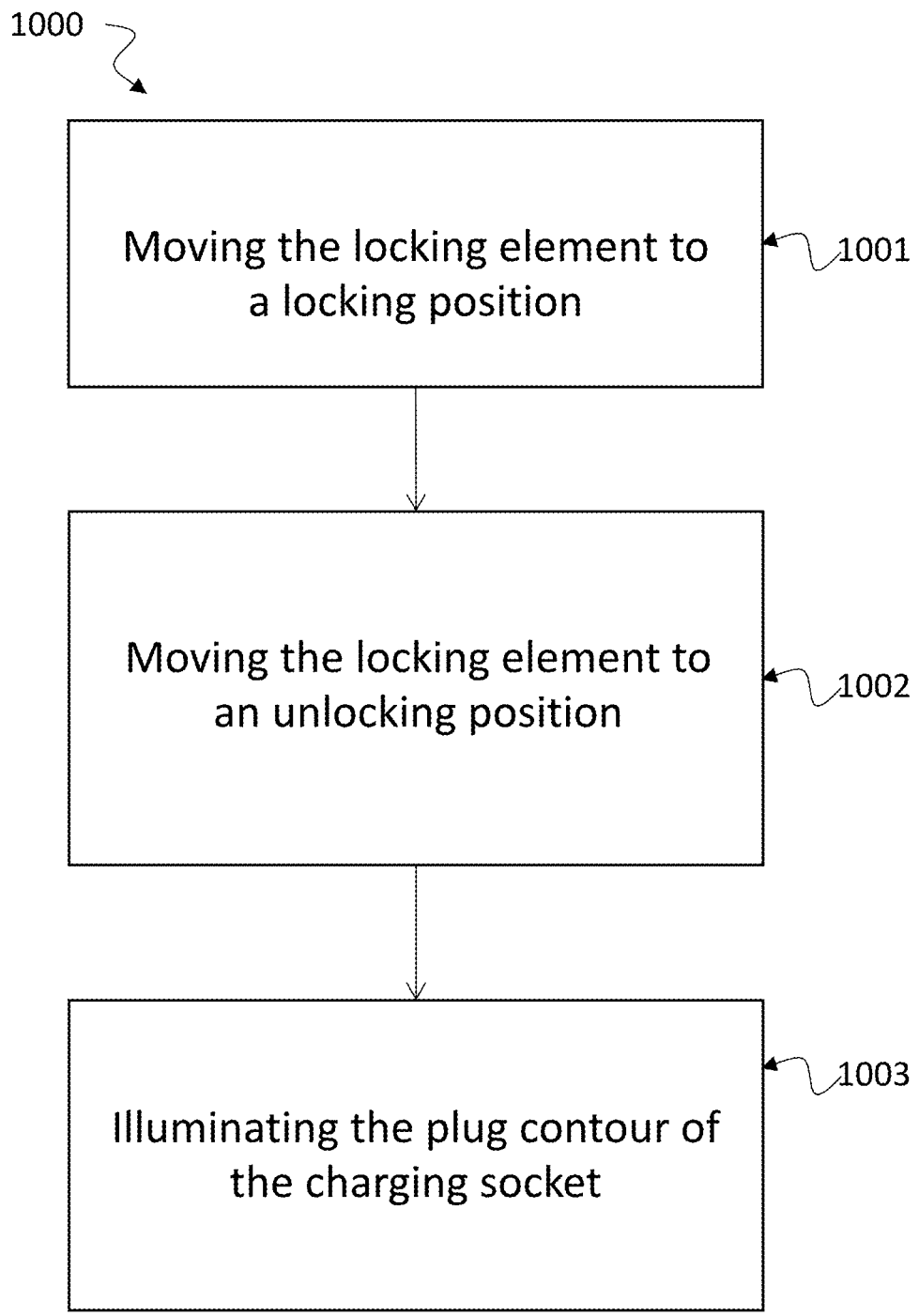
FIG. 10 depicts a schematic representation of a method for locking a charging plug in a charging socket.

FIG. 10 depicts a schematic diagram of a method 1000 according to the invention for locking a charging plug in a charging socket.

The method 1000 for locking a charging plug in a charging socket 101 of an electric vehicle for charging a battery of the electric vehicle, wherein the charging socket 101 has a plug contour 104 corresponding to a plug contour of the charging plug according to the illustration in FIG. 2, comprises the following steps:

Moving 1001 a locking element 120 upon insertion of the charging plug into the charging socket 101 to a locking position in which the locking element engages the charging plug and fixes the charging plug inserted into the charging socket, as shown for example in FIGS. 3B and 4B;

Moving 1002 the locking member 120, upon release of the charging plug from the charging receptacle to an unlocking position in which the locking member releases the charging plug and the charging plug can be released from the charging receptacle, such as shown in FIGS. 3A and 4A;

Illuminating 1003 the plug contour 104 of the charging receptacle 101 with a light guide 320 when the locking member 120 is in the unlocked position to facilitate insertion of the charging plug into the charging receptacle, wherein the light guide 320 is housed in a locking device 110 together with the locking member 120 and a drive 310 for moving the locking member 120, such as shown in FIGS. 2 to 9.

Further, a computer program including a program code for executing the method 1000 in a controller of an electric vehicle as described above with respect to FIGS. 2 to 9 may be provided.

What is claimed is:

1. A locking device for locking a charging plug in a charging socket of an electric vehicle for charging a battery of the electric vehicle, the charging socket comprising a plug contour corresponding to a plug contour of the charging plug, the locking device comprising:
   a locking member configured to move, upon insertion of the charging plug into the charging socket, to a locking position in which the locking member engages the charging plug and fixes the charging plug inserted into the charging socket, the locking member being further configured to move, upon release of the charging plug from the charging socket, to an unlocking position in which a locking element releases the charging plug and the charging plug is configured to be released from the charging socket;
   a drive configured to move the locking member to the locking position upon insertion of the charging plug into the charging socket and to move the locking member to the unlocking position upon release of the charging plug from the charging socket;
   a light guide configured to illuminate the plug contour of the charging socket when the locking member is in the unlocking position so as to enable insertion of the charging plug into the charging socket; and
   wherein the light guide is arranged integrated into the locking element and configured to move with the locking element into the locking position or the unlocking position.

2. The locking device according to claim 1, wherein the light guide is configured to couple out light in an illumination direction that is parallel to a plane of the plug contour of the charging socket.

3. The locking device according to claim 1, wherein the locking device comprises a light source arranged to be coupled to the light guide in the unlocked position of the locking element and configured to guide light into the light guide so as to illuminate the plug contour of the charging socket.

4. The locking device according to claim 3, wherein the light guide is configured and arranged to move away from the light source when the locking member moves from the unlocking position to the locking position.

5. The locking device according to claim 1, wherein the light guide is configured and arranged to move with the locking member along an illumination axis of the light guide when the locking member moves from the unlocking position to the locking position and vice versa.

6. The locking device according to claim 1, wherein the locking element comprises a cylindrical cavity configured for introduction of the light guide in a force-fit, form-fit or material-fit manner.

7. The locking device according to claim 1, wherein:
the light guide is arranged separately from the locking element in the locking device, and an illumination axis of the light guide is arranged coaxially with a movement direction of the locking member.

8. The locking device according to claim 7, further comprising a housing comprising:
a first opening configured such that through which the housing the locking member is enabled to move when moving from the unlocking position to the locking position and vice versa, and
a second opening configured such that insertion of the light guide into the second opening is enabled.

9. The locking device according to claim 8, wherein the first opening and the second opening are arranged on the same side of the housing.

10. The locking device according to claim 8, wherein the housing further comprises, in the region of the second opening, a chamber configured to accommodate a light source arranged therein, the light source arranged to couple light into the light guide.

11. The locking device according to claim 1, wherein the light guide is arranged to exit the second opening of the housing and configured to guide light to a location spaced from the housing and couple out the light thereat.

12. The locking device according to claim 1, further comprising a transparent seal configured and arranged to seal the second opening of the housing and form the light guide.

13. The locking device according to claim 12, wherein the transparent seal is configured to couple light out of the second opening of the housing in a plurality of illumination directions.

14. The locking device according to claim 1, wherein:
the electric vehicle comprising a design panel comprising an illuminatable status indicator configured to make visible a status of the charging socket receptacle when illuminated; and
the locking device further comprises a second light guide configured to direct light to the design bezel and illuminate the status indicator.

15. The locking device according to claim 14, wherein the second light guide is configured to couple out light in an illumination direction that is perpendicular to an illumination direction in which the light guide couples out light.

16. A method for locking a charging plug in a charging socket of an electric vehicle for charging a battery of the electric vehicle, the charging socket having a plug contour corresponding to a plug contour of the charging plug, the method comprising the steps of:
moving a locking member, upon insertion of the charging plug into the charging socket, to a locking position in which the locking member engages the charging plug and fixes the charging plug inserted into the charging socket;
moving the locking member upon release of the charging plug from the charging socket to an unlocking position in which the locking member releases the charging plug and the charging plug can be released from the charging socket; and
illuminating the plug contour of the charging socket with a light guide when the locking member is in the unlocked position to facilitate insertion of the charging plug into the charging socket, and
wherein the light guide is housed in a locking device together with the locking member and a drive for moving the locking member.

\* \* \* \* \*